(12) United States Patent
Liu et al.

(10) Patent No.: US 10,093,069 B2
(45) Date of Patent: Oct. 9, 2018

(54) METHOD OF FORMING LARGE DIAMETER THERMOPLASTIC SEAL

(71) Applicants: Yuxiang Liu, Sugarland, TX (US);
Rojendra Singh, Natick, MA (US)

(72) Inventors: Yuxiang Liu, Sugarland, TX (US);
Rojendra Singh, Natick, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 1283 days.

(21) Appl. No.: 13/901,061

(22) Filed: May 23, 2013

(65) Prior Publication Data

US 2013/0337218 A1 Dec. 19, 2013

Related U.S. Application Data

(60) Provisional application No. 61/650,962, filed on May 23, 2012.

(51) Int. Cl.
*B29D 99/00* (2010.01)
*B29C 65/02* (2006.01)
(Continued)

(52) U.S. Cl.
CPC .......... *B29D 99/0053* (2013.01); *B29C 53/36* (2013.01); *B29C 65/02* (2013.01); *B29C 66/1142* (2013.01); *B29C 66/4322* (2013.01); *B29C 66/4324* (2013.01); *B29C 66/5268* (2013.01); *B29C 66/723* (2013.01); *B29C 66/73921* (2013.01); *B29C 66/91411* (2013.01); *B29C 66/91445* (2013.01); *B29C 66/91933* (2013.01); *B29C 66/91943* (2013.01); *B29D 99/0085* (2013.01); *F16J 15/027* (2013.01); *B29C 65/04* (2013.01); *B29C 65/08* (2013.01);
(Continued)

(58) Field of Classification Search
None
See application file for complete search history.

(56) References Cited

U.S. PATENT DOCUMENTS

| | | |
|---|---|---|
| 3,207,644 A | 9/1965 | Hobson, Jr. et al. |
| 3,891,490 A | 6/1975 | Humphries |

(Continued)

FOREIGN PATENT DOCUMENTS

| | | |
|---|---|---|
| CN | 2037413 U | 5/1989 |
| CN | 1317020 A | 10/2001 |

(Continued)

OTHER PUBLICATIONS

O-20754-PC International Search Report for PCT/US2013/042435 dated Aug. 27, 2013, 1 page.

(Continued)

*Primary Examiner* — Barbara J Musser

(74) *Attorney, Agent, or Firm* — Abel Law Group, LLP; Chi Suk Kim

(57) ABSTRACT

A structure for and method of producing large diameter seal rings. Preferred embodiments of the present invention make use of a co-extruded "support" layer of a polymer showing better weld quality and strength. The use of a co-extruded support polymer bonded to the functional polymer can be used to improve the strength of the entire weld, including the weld of functional polymer layer.

18 Claims, 7 Drawing Sheets

(51) Int. Cl.

| | | |
|---|---|---|
| *F16J 15/02* | (2006.01) | |
| *B29C 65/00* | (2006.01) | |
| *B29C 53/36* | (2006.01) | |
| B29C 65/08 | (2006.01) | |
| B29C 65/14 | (2006.01) | |
| B29C 65/16 | (2006.01) | |
| B29C 65/04 | (2006.01) | |
| B29L 31/26 | (2006.01) | |
| B29C 65/82 | (2006.01) | |
| B29L 31/00 | (2006.01) | |
| B29C 65/20 | (2006.01) | |

(52) U.S. Cl.
CPC .......... *B29C 65/14* (2013.01); *B29C 65/1425* (2013.01); *B29C 65/16* (2013.01); *B29C 65/20* (2013.01); *B29C 65/8215* (2013.01); *B29C 66/0344* (2013.01); *B29C 66/5241* (2013.01); *B29C 66/5261* (2013.01); *B29C 66/69* (2013.01); *B29C 66/71* (2013.01); *B29C 66/721* (2013.01); *B29C 66/73115* (2013.01); *B29C 66/73117* (2013.01); *B29C 66/919* (2013.01); *B29L 2031/265* (2013.01); *B29L 2031/709* (2013.01); *B29L 2031/7096* (2013.01); *Y10T 428/215* (2015.01)

(56) References Cited

U.S. PATENT DOCUMENTS

| | | | |
|---|---|---|---|
| 3,897,296 A | 7/1975 | Waldrum | |
| 3,994,767 A | 11/1976 | Smith | |
| 4,034,967 A | 7/1977 | Gustairs | |
| 4,110,150 A | 8/1978 | Ostrowski et al. | |
| 4,157,274 A | 6/1979 | Johnson, III et al. | |
| 4,189,340 A | 2/1980 | Newkirk | |
| 4,197,149 A | 4/1980 | Freitag et al. | |
| 4,207,135 A | 6/1980 | Pavano | |
| 4,239,574 A | 12/1980 | Aust et al. | |
| 4,352,977 A | 10/1982 | Hardigg et al. | |
| 4,369,779 A | 1/1983 | Spencer | |
| 4,412,835 A | 11/1983 | Spencer | |
| 4,521,263 A | 6/1985 | Benin et al. | |
| 4,610,670 A | 9/1986 | Spencer | |
| 4,752,350 A | 6/1988 | Schuster | |
| 4,752,512 A | 6/1988 | Wolff | |
| 4,753,697 A | 6/1988 | Shaposka et al. | |
| 4,781,787 A | 11/1988 | Weissfloch et al. | |
| 4,867,835 A | 9/1989 | Poole | |
| 4,925,519 A | 5/1990 | Newkirk et al. | |
| 4,927,642 A | 5/1990 | Kunz | |
| 4,929,712 A | 5/1990 | Sugiyama et al. | |
| 4,963,219 A | 10/1990 | Nichols et al. | |
| 4,978,408 A | 12/1990 | Burford et al. | |
| 4,986,947 A | 1/1991 | Shigeki et al. | |
| 4,990,296 A | 2/1991 | Pitolaj | |
| 4,995,935 A | 2/1991 | Ganzberger | |
| 5,006,198 A | 4/1991 | Pasquini | |
| 5,142,117 A | 8/1992 | Hoggatt et al. | |
| 5,183,860 A | 2/1993 | Kashihara | |
| 5,229,562 A | 7/1993 | Burnett et al. | |
| 5,292,824 A | 3/1994 | Nagai et al. | |
| 5,326,846 A | 7/1994 | Nagai et al. | |
| 5,338,611 A | 8/1994 | Lause et al. | |
| 5,370,761 A | 12/1994 | Chitouras | |
| 5,460,674 A | 10/1995 | Chitouras | |
| 5,462,706 A | 10/1995 | McMillan et al. | |
| 5,472,334 A | 12/1995 | Takahashi | |
| 5,486,648 A | 1/1996 | Chan et al. | |
| 5,486,684 A | 1/1996 | Peterson et al. | |
| 5,500,511 A | 3/1996 | Hansen et al. | |
| 5,591,292 A | 1/1997 | Blomqvist | |
| 5,665,825 A | 9/1997 | Davies et al. | |
| 5,799,953 A | 1/1998 | Henderson | |
| 5,717,191 A | 2/1998 | Christensen et al. | |
| 5,770,006 A | 6/1998 | Andrew et al. | |
| 5,793,017 A | 8/1998 | Yamada et al. | |
| 5,834,081 A | 11/1998 | Fanti | |
| 5,837,095 A | 11/1998 | Bruchu et al. | |
| 5,852,135 A | 12/1998 | Kanai et al. | |
| 5,854,324 A | 12/1998 | Tajima et al. | |
| 5,855,720 A | 1/1999 | Johnson et al. | |
| 5,865,443 A | 2/1999 | Abe | |
| 5,869,814 A | 2/1999 | Scoles | |
| 5,876,541 A | 3/1999 | Chitouras | |
| 5,879,789 A | 3/1999 | Dolan et al. | |
| 5,902,447 A | 5/1999 | Johnson et al. | |
| 5,914,195 A | 6/1999 | Hori et al. | |
| 5,921,587 A | 7/1999 | Lueghamer | |
| 5,925,277 A | 7/1999 | Stoles | |
| 5,985,949 A | 11/1999 | Seguchi et al. | |
| 6,123,891 A | 9/2000 | De Tonnac | |
| 6,204,301 B1 | 3/2001 | Oshima et al. | |
| 6,228,204 B1 | 5/2001 | Reinhardt et al. | |
| 6,284,089 B1 | 9/2001 | Anderson et al. | |
| 6,297,478 B1 | 10/2001 | Kano et al. | |
| 6,313,440 B1 | 11/2001 | Weber et al. | |
| 6,326,099 B1 | 12/2001 | Schubert | |
| 6,340,718 B1 | 1/2002 | Korenev et al. | |
| 6,358,348 B1 | 3/2002 | Pollack et al. | |
| 6,444,946 B1 | 9/2002 | Korte | |
| 6,465,575 B1 | 10/2002 | Kusano et al. | |
| 6,488,793 B2 | 12/2002 | Natrop et al. | |
| 6,488,802 B1 | 12/2002 | Levingston et al. | |
| 6,490,839 B1 | 12/2002 | MacQuart et al. | |
| 6,531,559 B1 | 3/2003 | Smith et al. | |
| 6,552,099 B2 | 4/2003 | Yamamoto et al. | |
| 6,568,942 B2 | 5/2003 | Anderson et al. | |
| 6,596,110 B1 | 7/2003 | Chitouras | |
| 6,709,457 B1 | 3/2004 | Otte et al. | |
| 6,737,165 B1 | 5/2004 | Smith et al. | |
| 6,787,221 B2 | 9/2004 | Botrie et al. | |
| 6,811,632 B2 | 11/2004 | Nelson et al. | |
| 6,884,827 B2 | 4/2005 | Ota et al. | |
| 6,918,986 B2 | 7/2005 | Cupp | |
| 7,175,725 B2 | 2/2007 | Chitouras | |
| 7,314,646 B2 | 1/2008 | Sawyer et al. | |
| 7,563,050 B2 | 7/2009 | Strait | |
| 7,754,322 B2 | 7/2010 | Tillbrook et al. | |
| 7,923,102 B2 | 4/2011 | Tillbrook et al. | |
| 8,034,855 B2 | 10/2011 | Asai et al. | |
| 2002/0038687 A1 | 4/2002 | Anderson et al. | |
| 2002/0058183 A1 | 5/2002 | Ono et al. | |
| 2002/0132947 A1 | 9/2002 | Smith et al. | |
| 2002/0158424 A1 | 10/2002 | Yanagiguchi et al. | |
| 2002/0169237 A1 | 11/2002 | Ono et al. | |
| 2003/0001307 A1 | 1/2003 | Miller | |
| 2003/0122318 A1 | 7/2003 | Yanagiguchi et al. | |
| 2004/0082701 A1 | 4/2004 | Ota et al. | |
| 2004/0143069 A1 | 7/2004 | Matsuoka et al. | |
| 2004/0157035 A1* | 8/2004 | Guizzetti | B32B 5/18 428/66.6 |
| 2004/0232624 A1 | 11/2004 | Hisano et al. | |
| 2004/0251634 A1 | 12/2004 | Shimazu et al. | |
| 2005/0043492 A1 | 2/2005 | Chin et al. | |
| 2005/0230859 A1 | 10/2005 | Hamaguchi et al. | |
| 2006/0029795 A1 | 2/2006 | Sawyer et al. | |
| 2006/0135692 A1 | 6/2006 | Shibata et al. | |
| 2006/0192348 A1* | 8/2006 | Andrick | F16L 21/025 277/602 |
| 2006/0199911 A1 | 9/2006 | Markovich et al. | |
| 2006/0220272 A1 | 10/2006 | Smith et al. | |
| 2007/0023129 A1 | 2/2007 | Stieler et al. | |
| 2007/0066739 A1 | 3/2007 | Odle et al. | |
| 2007/0148389 A1 | 6/2007 | Nishioka et al. | |
| 2008/0038144 A1 | 2/2008 | Maziasz et al. | |
| 2009/0152491 A1 | 6/2009 | Saga | |
| 2009/0163955 A1 | 6/2009 | Moumene et al. | |

(56) References Cited

U.S. PATENT DOCUMENTS

| | | | |
|---|---|---|---|
| 2010/0116422 A1 | 5/2010 | Vaideeswaran et al. | |
| 2010/0117310 A1 | 5/2010 | Celik et al. | |

FOREIGN PATENT DOCUMENTS

| | | | |
|---|---|---|---|
| CN | 1338123 | A | 2/2002 |
| CN | 1379850 | A | 11/2002 |
| CN | 1418241 | A | 5/2003 |
| CN | 1865384 | A | 11/2006 |
| DE | 29512613 | U1 | 12/1996 |
| EP | 0332939 | A2 | 9/1989 |
| EP | 0414298 | B1 | 6/1994 |
| FR | 2835303 | A1 | 8/2003 |
| GB | 0758447 | | 10/1956 |
| GB | 1293906 | | 10/1972 |
| IT | 1078629 | B | 5/1985 |
| JP | 61-022248 | U | 2/1986 |
| JP | 62-189137 | A | 8/1987 |
| JP | 63-163071 | A | 7/1988 |
| JP | S63-280967 | A | 11/1988 |
| JP | H1-193330 | A | 8/1989 |
| JP | H02-134471 | A | 5/1990 |
| JP | H06-240147 | A | 8/1994 |
| JP | H07-232394 | A | 9/1995 |
| JP | H09-066584 | A | 3/1997 |
| JP | H10-318375 | A | 2/1998 |
| JP | 10-318375 | A | 12/1998 |
| JP | H11-005965 | A | 1/1999 |
| JP | H11-189108 | A | 7/1999 |
| JP | 2000-327903 | A | 11/2000 |
| JP | 2001-004032 | A | 1/2001 |
| JP | 2002-226604 | A | 8/2002 |
| JP | 2002-292799 | A | 10/2002 |
| JP | 2004-003617 | A | 1/2004 |
| JP | 2004-018614 | A | 1/2004 |
| JP | 2004-108522 | A | 4/2004 |
| JP | 2004-217888 | A | 8/2004 |
| JP | 2004-291609 | A | 10/2004 |
| JP | 2005-178105 | A | 7/2005 |
| JP | 2005-188710 | A | 7/2005 |
| JP | 2005-307090 | A | 11/2005 |
| JP | 2005-344038 | A | 12/2005 |
| JP | 2006-249187 | A | 9/2006 |
| JP | 2007-173420 | A | 7/2007 |
| WO | 98/03286 | A1 | 1/1998 |
| WO | 01/90274 | A1 | 11/2001 |
| WO | 2004/111125 | A1 | 12/2004 |
| WO | 2010/054241 | A2 | 5/2010 |
| WO | 2010/054243 | A2 | 5/2010 |

OTHER PUBLICATIONS

"Jitsuyo Plastic Yougo Jiten," Sep. 10, 1989, 6 pages.
Arzak et al., "Effect if Annealing on the Properties of Poly(Ether Ether Ketone)," Polymer Engineering and Science, Apr. 1991, vol. 31, No. 8, p. 586.
Burris et al., "A Low Friction and Ultra Low Wear Rate Peek/PTFE Composite," Wear 261 (2006), pp. 410-418.
Supplementary European Search Report issued in Application No. 13793721.5 dated Mar. 10, 2016, 1 page.
Supplementary European Search Report issued in Application No. 13793721.5 dated Mar. 10, 2016, 1 pg.
Notification of the First Office Action (translation for information purposes only) received from the State Intellectual Property Office (SIPO) of China for Chinese Application No. 2009801509834, dated Apr. 3, 2015, 21 pages.
Hague, A. et al., Sensitivity of the Acoustic Impact Technique in Characterizing Defects/Damage in Laminated Composites, Journal of Reinforced Plastics and Composites, 1995, vol. 14, No. 3, pp. 280-296.
Search Results, 13 pages.
B.L. Gregory et al., Deformation Behaviour of coextruded multilayer composites with polycarbonate and poly(styrene-acrylonitrile), Journal of Materials Science, 1987, vol. 22, p. 532-538.
Encyclopedia of Polymers, Moscow, 1974, vol. 3, col. 623. Partial English language summary attached.
http://web.archive.org/web/20071014021420/http://www.boedeker.com/anneal.htm, captured Oct. 14, 2007.
International Search Report for PCT/US2009/063615 dated Jul. 27, 2010, 5 pgs.
International Search Report for PCT/US2009/063613 dated May 13, 2010, 3 pgs.
Practical Encylopedia of Plastics. Sep. 10, 1989, Revised Edition, vol. 3, p. 535.
U.S. Appl. No. 12/614,191, filed Nov. 6, 2009, Inventors: Karthik Vaideeswaran et al.
U.S. Appl. No. 12/614,205, filed Nov. 6, 2009, Inventors: Ceyhan Celik et al.
Membrane chemistry and technology, Dec. 31, 2003, Tong-wen Ku, University of science and technology of China press, p. 38.
Materials science and engineering manual, Jan. 31, 2004, Chang-xu Shi, Chemical Industry Press, pp. 8-46.

\* cited by examiner

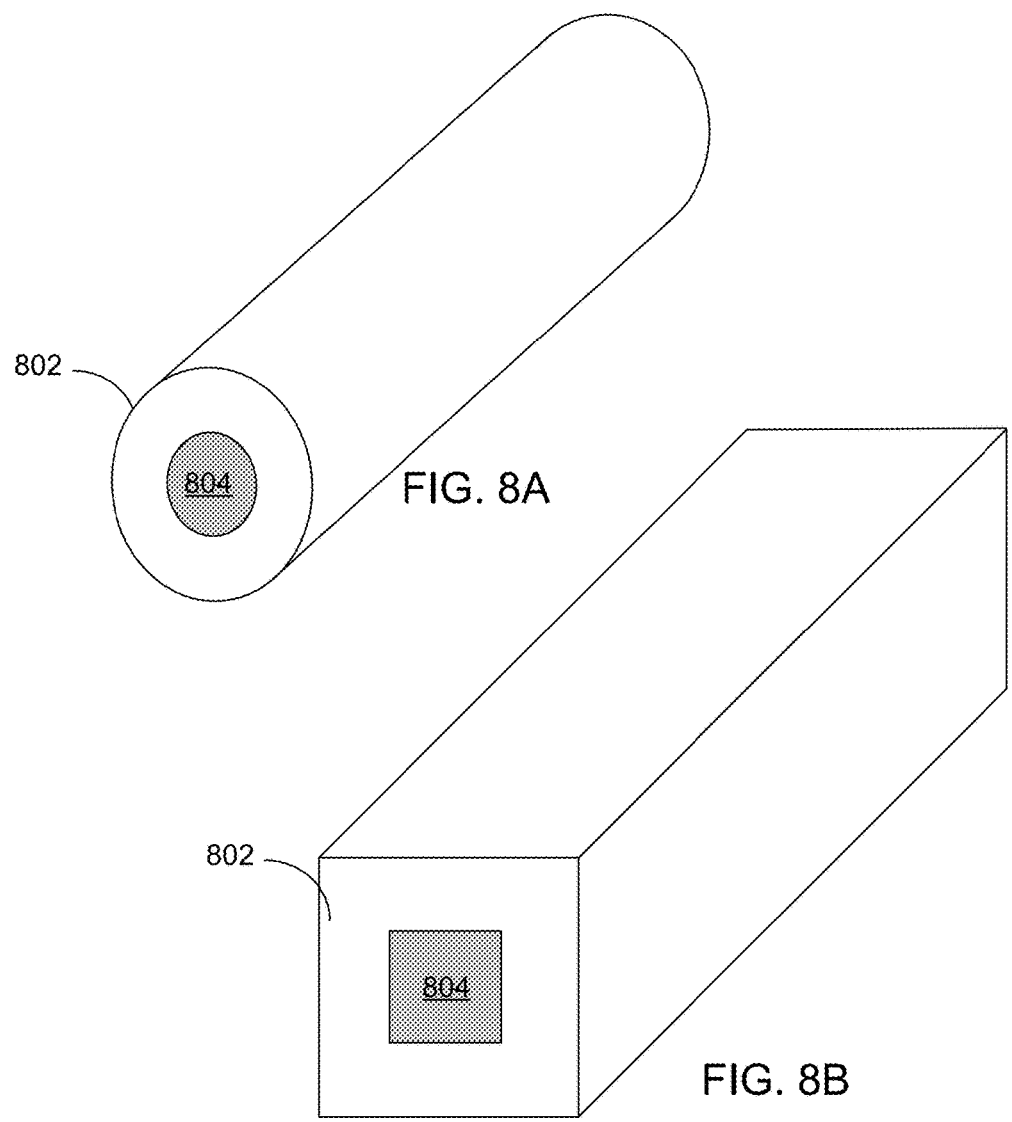

METHOD OF FORMING LARGE DIAMETER THERMOPLASTIC SEAL

CROSS-REFERENCE TO RELATED APPLICATION(S)

The present application claims priority from U.S. Provisional Patent Application No. 61/650,962, filed May 23, 2012, entitled "METHOD OF FORMING LARGE DIAMETER THERMOPLASTIC SEAL," naming inventors Yuxiang LIU and Rojendra SINGH, which application is incorporated by reference herein in its entirety.

FIELD OF THE DISCLOSURE

This disclosure, in general, relates to thermoplastic seals, and in particular to large diameter thermoplastic seals formed using polymers filled with PTFE or other fillers.

BACKGROUND

Various industries are increasingly turning to large-scale equipment to meet operational demands. As industry develops large-scale equipment, it seeks large-scale components, such as seals and o-rings. Often, the large-scale equipment is located in remote harsh environments, increasing demand for durable and hardy seals. For example, as the oil and gas industry seeks to drill in deeper water, the scale of the equipment used is increasing and, as a result, the demand for more durable, large-scale products that can survive harsh environments increases.

PTFE filled polymers are highly desirable for a variety of applications such as large diameter seal rings, back-up rings, or other seal devices (collectively referred to as seal rings herein). These large diameter seal rings are often used, for example, by the oil and gas industry. As used herein, the phrase "large diameter" will be used to describe diameters of at least 600 mm. Such large diameter seal rings cannot be easily made by conventional molding techniques used for smaller rings.

One method of forming these types of large diameter rings is described in U.S. Pat. App. No. 2010/0116422 by Vaideeswaran et al., for "Method of Forming Large Diameter Thermoplastic Seal," which is assigned to the assignee of the present application and which is hereby incorporated by reference. According to the method described by Vaideeswaran, large diameter seal rings are formed using extruded thermoplastic rods, which are bent into a circular shape and then welded together at the ends to form a seal ring.

Unfortunately, PTFE filled materials, while highly desirable for their wear characteristics and low friction, are often difficult to use with typical heat welding processes. Specifically, the welded portion of a PTFE polymer will often show a reduced elongation to break as compared to the unfilled polymer. This makes such PTFE filled materials less suitable for applications such as large diameter seal rings, back-up rings, or other seal devices, where an elongation to break of at least 3% is desirable.

As such, a new method of forming a large-diameter seal using polymers filled with PTFE or other fillers would be desirable.

SUMMARY OF THE INVENTION

A preferred embodiment of the present invention is directed to a novel structure for and method of producing large diameter seal rings, back-up rings, or other seal devices. Various types of sealed polymers, while having advantageous physical characteristics, are difficult to use with methods of forming large diameter seal rings using heat welding. Preferred embodiments of the present invention make use of a co-extruded "support" layer of a polymer showing better weld quality and strength. Applicants have discovered that the use of a co-extruded support polymer bonded to the functional polymer surprisingly improves the strength of the entire weld, including the weld of functional polymer layer.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The present disclosure may be better understood, and its numerous features and advantages made apparent to those skilled in the art by referencing the accompanying drawings.

FIG. 8A shows a seal ring segment according to another embodiment of the present invention in which the seal ring has a rectangular cross section.

FIG. 8B shows a seal ring segment according to another embodiment of the present invention in which the seal ring has a polygonal cross section having 4 sides.

The accompanying drawings are not intended to be drawn to scale. In the drawings, each identical or nearly identical component that is illustrated in various figures is represented by a like numeral. For purposes of clarity, not every component may be labeled in every drawing.

DESCRIPTION OF THE DRAWINGS

Although filled polymers, such as PTFE filled materials, often have highly desirable characteristics, they can be difficult to use with typical heat welding processes. Specifically, the welded portion of a filled polymer, such as a PTFE filled polymer, will often show a reduced elongation to break as compared to the unfilled polymer. This makes such PTFE filled materials less suitable for applications such as large diameter seal rings, back-up rings, or other seal devices, where an elongation to break of at least 3% is desirable.

Applicants have discovered that the use of a co-extruded "support" layer of an unfilled polymer surprisingly improves the strength of the entire weld, including the weld of PTFE filled polymer layer. The functional PTFE filled layer can be oriented toward the interior of the seal (on the inner perimeter toward the opening) or toward the outside (on the outer perimeter) depending upon where the functional PTFE filler is needed for the particular seal application. In many typical applications, the PTFE filled layer will be preferably oriented toward the interior of the seal as shown in FIG. 1 described below.

Figure 1:
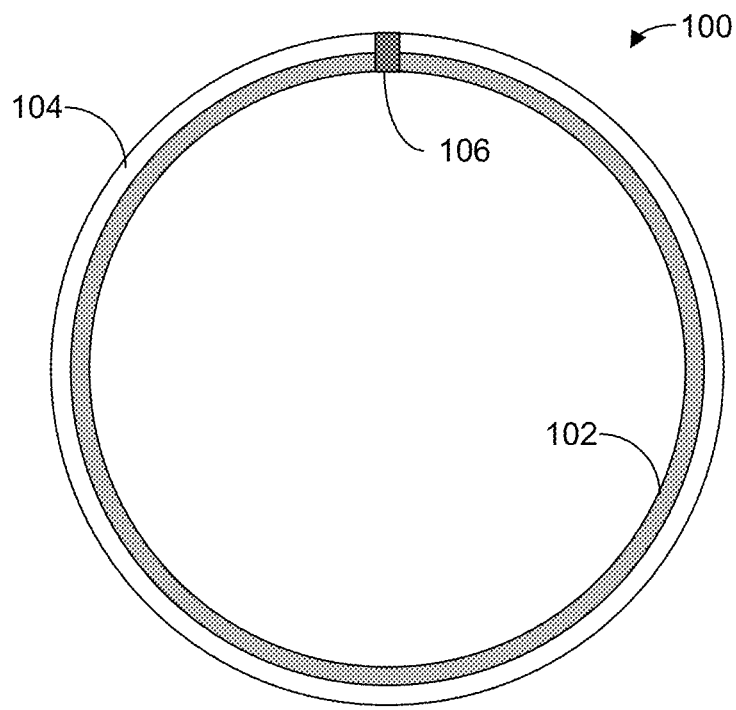
FIG. 1 shows a seal ring according to a preferred embodiment of the present invention.
Figure 2:
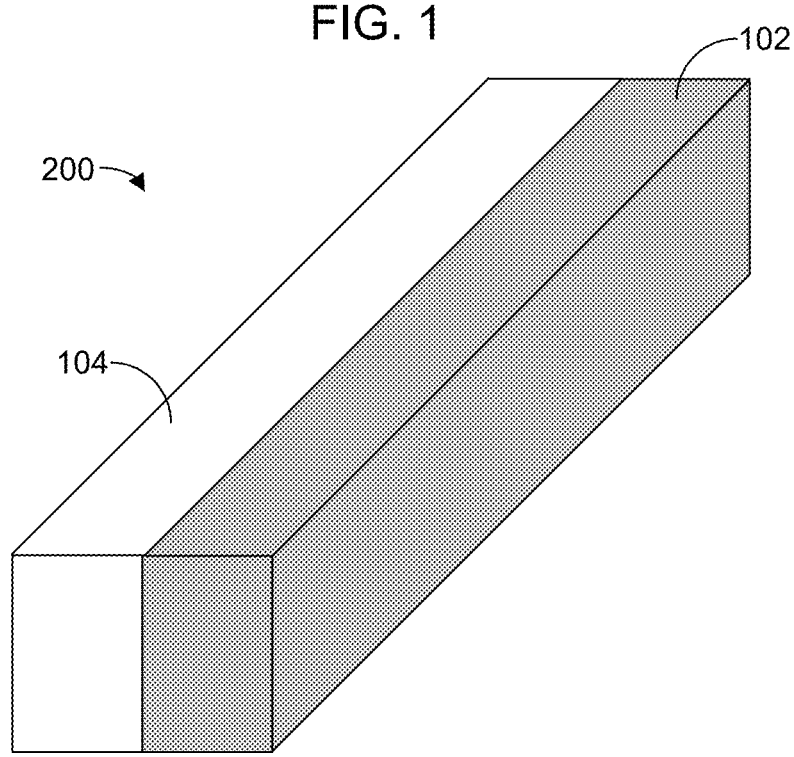
FIG. 2 is a schematic diagram illustrating an extruded thermoplastic rod having two polymer layers according to embodiments of the present invention.

As illustrated in FIGS. 1 and 2, a seal ring 100 may be formed from a thermoplastic rod 200. Preferably, the thermoplastic rod is an extruded thermoplastic rod, such as a melt extruded rod. Alternatively, the rod 200 may be a compression molded rod. Thermoplastic rod 200 preferably comprises at least two co-extruded thermoplastic polymers, the two polymers forming a first longitudinal layer 102 and a second longitudinal layer 104 joined together by weld 106. In preferred embodiments of the present invention, at least one layer comprises a PTFE filled compound such as PTFE filled PEEK. As discussed above, PTFE filled compounds such as PTFE filled PEEK can be very difficult to weld. The typical weld of such material has an elongation to break that is less than the 3% value desired for many seal ring applications. By co-extruding a PTFE filled polymer layer with another unfilled polymer layer having a superior weld tensile strength or weld elongation at break, Applicants have discovered that the strength of the entire weld, including the weld of the PTFE filled polymer, can be improved.

Figure 3:
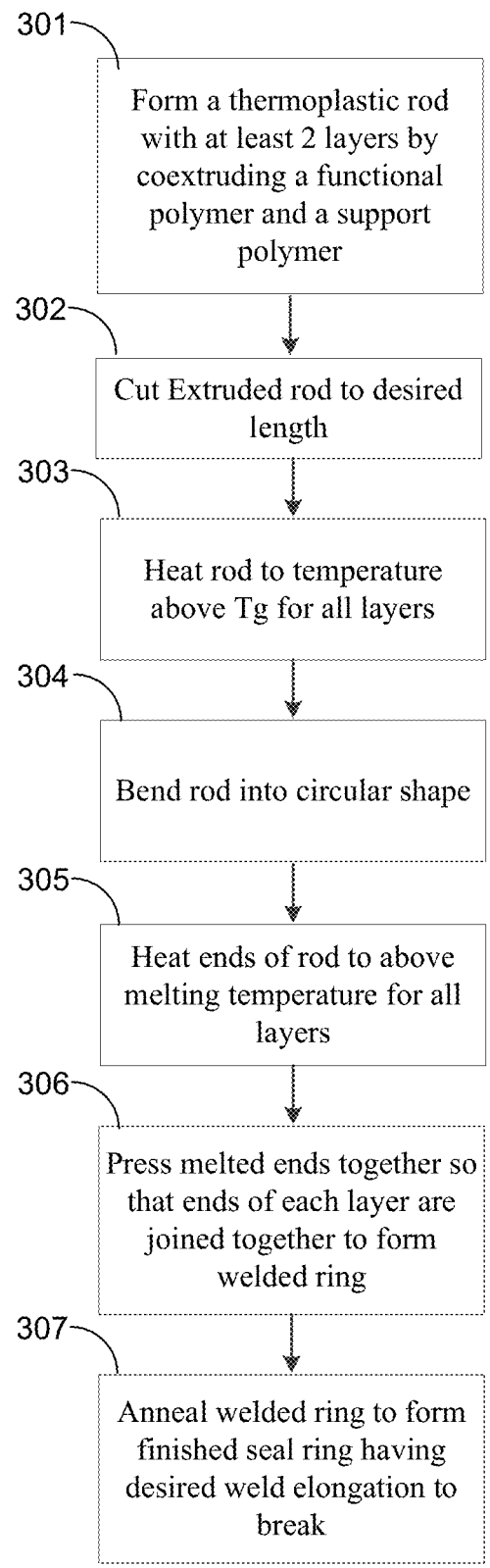
FIG. 3 is a flow chart showing the steps in a method of producing a seal ring according to preferred embodiments of the present invention.

FIG. 3 is a flow chart showing the steps in a method of producing a seal ring according to preferred embodiments of the present invention. A preferred method of forming a seal ring includes, in step 301, forming a thermoplastic rod by coextrusion of a functional polymer, such as a polytetrafluoroethylene (PTFE) filled polymer, and a support polymer so that the formed thermoplastic rod includes at least a first layer of functional polymer and a second layer of unfilled polymer. Such a two layer extruded rod is shown schematically in FIG. 2. After the extruded rod is cut to the desired length (step 302), the rod is then heated to a temperature above the glass transition temperature of both of the polymer layers in step 303. In step 304, the rod is bent into a circular shape. Once the rod has been bent to form a ring, the first and second ends of the rod are heated to a temperature above the melting temperature of both layers in step 305. The melted ends are then pressed together to form a welded ring in step 306. Preferably the ends are joined so that the ends of the PTFE filled layer are joined together and the ends of the unfilled polymer layer are joined together; in other words so that the PTFE filled polymer is welded to PTFE filled polymer and the unfilled polymer is welded to unfilled polymer. Finally, in step 307, the welded ring is annealed to strengthen the weld and the bond between the co-extruded layers.

The thermoplastic rod can be of any desired shape. For example, the rod can be formed as a straight rod having a rectangular cross section and two longitudinal layers of approximately equal sizes, as shown in FIG. 2. Alternatively, the rod may have a circular cross-section or a polygonal cross-section. In an example, for a polygonal cross-section, the polygon may have four or more sides. As an alternative to heating and bending, an extruded rod may be extruded in the form of an arc and the ends of the arc joined to form the sealing device. In another alternative, arcs may be cut from sheets of material, such as extruded sheets or compression molded sheets, and the ends of the arcs joined.

The thermoplastic rod may be formed two or more layers of a thermoplastic material, such as an engineering or high performance thermoplastic polymer. In preferred embodiments, at least one layer (also referred to herein as a functional layer) is formed from a thermoplastic material having a desirable characteristic, but having an undesirable physical characteristic for welded material. For example, the thermoplastic material having a desirable characteristic may be a composite material formed of a thermoplastic material matrix and a filler. In a particular example, the filler is a solid lubricant. In another example, the filler includes a fluoropolymer. In a further example, the filler includes a combination of solid lubricant and fluoropolymer. In an embodiment, the composite material includes a polyketone matrix, such as PEEK, with PTFE as a filler. As described below, other solid lubricants could also be used as fillers.

Although much of discussion herein is directed at PTFE filled polymers, embodiments of the present invention could also be used with various other types of filled polymers that show reduced weld tensile strength or weld elongation at break. In preferred embodiments, fillers other than PTFE can be used according to the present invention. For example, the filler used could include a different solid lubricant, a ceramic or mineral filler, a polymer filler, a fiber filler, a metal particulate filler or salts or any combination thereof. Exemplary solid lubricants other than PTFE that could be used include molybdenum disulfide, tungsten disulfide, graphite, graphene, expanded graphite, boron nitride, talc, calcium fluoride, cerium fluoride, or any combination thereof. An exemplary ceramic or mineral filler could include alumina, silica, titanium dioxide, calcium fluoride, boron nitride, mica, Wollastonite, silicon carbide, silicon nitride, zirconia, carbon black, pigments, or any combination thereof. An exemplary polymer filler could include polyimide, liquid crystal polymers such as Ekonol® polyester, polybenzimidazole, polytetrafluoroethylene, any of the thermoplastic polymers listed above, or any combination thereof. An exemplary fiber filler could include nylon fibers, glass fibers, carbon fibers, polyacrylonitrile fibers, polyaramid fibers, polytetrafluoroethylene fibers, basalt fibers, graphite fibers, ceramic fibers, or any combination thereof. An exemplary metal filler could include bronze, copper, stainless steel, or any combination thereof. An exemplary salt filler could include a sulfate, a sulfide, a phosphate, or any combination thereof.

In some embodiments, other types of thermoplastic materials could serve as the thermoplastic material matrix (the filled material), including polymers such as a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, a liquid crystal polymer, or any combination thereof. In an example, the thermoplastic material includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the thermoplastic material includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the thermoplastic material includes polyketone, including PEEK as discussed above, polyether ketone, polyether ketone ketone, polyether ketone ether ketone ketone, a derivative thereof, or a combination thereof. An exemplary thermoplastic material could also include aromatic polyester polymers, such as those available under trade names XYDAR® (Amoco), VECTRA® (Hoechst Celanese), SUMIKOSUPER™ or EKONOL™ (Sumitomo Chemical), DuPont HX™ or DuPont ZENITE™ (E. I. DuPont de Nemours), RODRUN™ (Unitika), GRANLAR™ (Grandmont), or any combination thereof. In an additional example, the thermoplastic polymer may be ultra high molecular weight polyethylene. Ultra high molecular weight polyethylene may be used in this process even though its glass transition temperature is approximately −160° C.

In other embodiments, the thermoplastic material could include thermoplastic fluoropolymers such as fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. In some cases, an unfilled polymer, such as PTFE alone, having the desirable characteristic could also be used according to embodiments of the present invention.

Using the specific example above, a seal ring formed from PTFE filled PEEK has very desirable characteristics, including desirable wear characteristics and low friction. Unfortunately, a seal ring formed by welding a PTFE filled PEEK rod as described above also has undesirable physical characteristics. Specifically, welded PTFE filled PEEK has an elongation to break of less than 3%, which is undesirable for a large diameter seal ring. Embodiments of the present invention provide a finished seal ring in which the desirable properties of the PTFE filled PEEK can be retained, while the undesirable elongation to break characteristic can be improved. Applicants have discovered that the combination of a layer of PTFE filled PEEK with a co-extruded "support" layer of polymer having a more desirable characteristic, such as elongation to break or tensile strength, surprisingly improves the strength of the entire weld, including the weld of the PTFE filled polymer layer.

A "support" polymer according to the present invention can be any thermoplastic material having a desired physical characteristic, such as elongation to break or tensile strength, that is sufficient to compensate for shortcomings (undesirable characteristics) of the functional polymer layer. Any of the thermoplastic materials described above suitable for use as the thermoplastic material matrix (the filled material) could also be used as the support polymer. In some preferred embodiments, the material used for the support polymer is the same material used as the thermoplastic material matrix (the filled material) in the functional layer. For example, in a preferred embodiment, PTFE filled PEEK could be used for the functional layer, while unfilled PEEK could be co-extruded as a support layer. Preferably, the support polymer and the thermoplastic material matrix will have similar glass transition and melting temperatures.

Preferably, the thermoplastic rod is formed by coextrusion of the two or more layers of thermoplastic material. Coextrusion is a well-known prior art process in which two or more polymers are extruded and joined together into a continuous profile. In a preferred embodiment, the two or more layers are melt extruded. In some embodiments, as an alternative to heating and bending, the layers may be extruded in the shape of an arc by controlling the relative speeds and amounts of materials extruded. Preferably, the two layers maintain a uniform thickness during extrusion. In the embodiment shown in FIG. 2, the two layers are of substantially identical thickness, although different layer thicknesses could be used depending upon the mechanical properties of the layers and the desired functional behavior of the finished seal ring. In some embodiments, the thermoplastic rod could be formed through other suitable known processes such as compression molding, although if other methods are used additional heating or annealing steps as described below may be necessary to generate the desired degree of bond strength between the rod layers.

In an example, the thickness of the cross section of the extruded rod, which becomes the radial thickness once bent, may be less than 1/5 or 20% of the outside diameter of a circle defined by the arc of bent extruded rod. For example, the outside diameter of the circle including an arc defined by the bent rod may be at least 5 times the radial thickness of the rod, such as at least 10 times the radial thickness, or even at least 20 times the radial thickness. In a particular embodiment, the radial thickness is at least 1 inch, such as at least 2 inches.

The cross-section of the extruded rod may be in the shape of a circle or in the shape of a polygon. In particular, the polygon may have at least three sides, such as at least four sides. In an example, the polygon is four-sided in cross-section, such as a rectangle or square. In a particular example, the cross-sectional area of the rod is at least 1 sq. in., such as at least 2 sq. in., or even at least 3 sq. in. Further, in some embodiments the cross-sectional area may be not greater than 50 sq. in.

Because the extrusion process produces a continuous length of material, the extruded rod must be cut to the desired length. The actual length of the rod will depend upon the desired diameter of the seal ring to be formed after bending and welding the rod. In preferred embodiments, the seal rings as described herein will have a circumference of at least 0.62 meters, such as at least 1.0 meters, at least 1.5 meters, at least 2.0 meters, at least 4.1 meters, at least 4.5 meters, or even at least 4.8 meters.

Once a thermoplastic rod of the desired composition and length has been formed, the rod must then be formed into a seal ring. This can be accomplished by first heating the rod to a temperature above the glass transition temperature of all of the polymer layers so that the rod can be easily bent into a circular shape. For example, extruded PEEK has a glass transition temperature of approximately 143° C. and a melting point of approximately 343° C. A PTFE filler has comparable glass transition and melting temperatures, approximately 130° C. (Tg) and 327° C. (MP). A composite of PEEK and PTFE would be more easily formed into a desired shape at a temperature above the glass transition temperature of both components and below the actual melting point of either material. In general the flexibility of the extruded rod will increase as the temperature is increased. In a preferred embodiment, the thermoplastic rod (including a layer of PTFE filled PEEK and a support layer of unfilled PEEK) would be heated to approximately 310° C. for maximum flexibility. Skilled persons will recognize that it will usually be undesirable to heat the rod above the melting temperature for any of the materials during the bending step.

In preferred embodiments, the thermoplastic support material and the functional layer matrix includes a thermoplastic material having a glass transition temperature greater than 100° C., such as at least 125° C., or even at least 145° C. One exception is ultra-high molecular weight polyethylene which has a glass transition temperature of −160° C. and a melt point of 135° C. The heat index of the thermoplastic material may be heated in a range of 0.60 to 0.999. The heat index is a ratio of the temperature to which a material is heated divided by the melting point. In a further example, the heat index may be in a range of 0.70 to 0.999, such as a range of 0.8 to 0.999, or even a range of 0.9 to 0.99.

Figure 5:
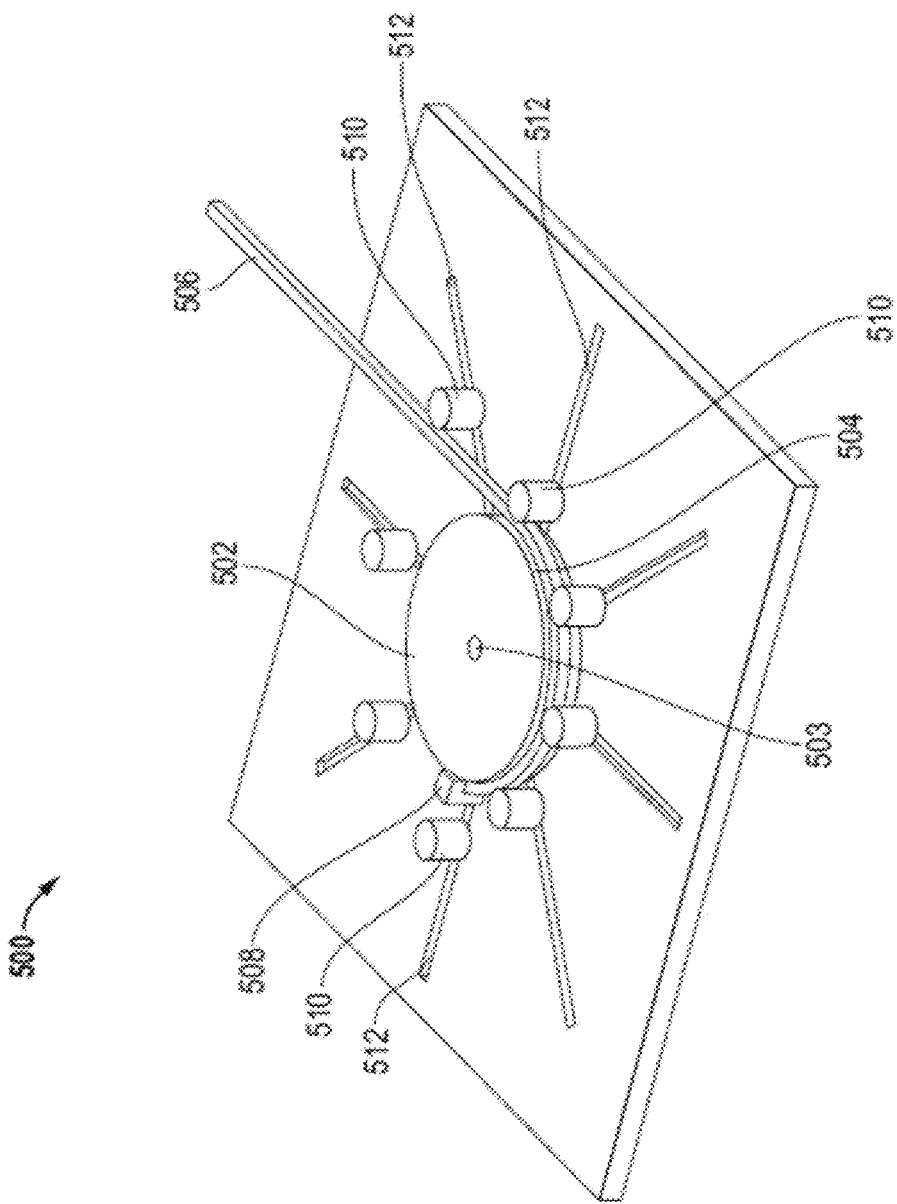
FIG. 5 includes an illustration of a prior art forming device that can be used to produce seal rings according to preferred embodiments of the present invention.

Once the thermoplastic rod of functional and support material has been heated to a point where it is sufficiently flexible, it can be formed into a circular shape, for example by using a forming machine as described in U.S. Pat. App. No. 2010/0116422. FIG. 5 shows a suitable forming machine 500 for bending the thermoplastic rod into a circular shape according to embodiments of the present invention. The forming machine 500 includes a circular mold 502 that pivots about an axis 503. Around the circumference of the circular mold 502 is a groove 504 for engaging an article 506. In particular, the article 506 may be clamped into the groove by clamp 508. In addition, the forming machine 500 may include a set of rollers 510 distributed around the circumference of the circular mold 502. An axis of a roller 510 may be attached to trucks that traverse tracks 512 or guide rods. Accordingly, the rollers 510 may engage the circular mold 502 or may be disengaged and moved away from the circular mold 502.

In use, the clamp 508 secures an article 506 to the circular mold 502. The circular mold 502 rotates and the clamp 508 rotates with the circular mold 502, drawing the article 506 around the circumference of the circular mold 502 and into the groove 504. As the clamp 508 moves past a roller 510, the roller 510 is engaged with the article 506 and the circular mold 502, applying radial force on the article 506. Accordingly, the article 506 is formed into an arc structure that may be used to form a seal ring. In a further example, the circular mold 502 may be heated to conductively heat the article 506. In another example, bending may be performed in a heated environment, such as an oven.

Once formed into the proper shape, the bent extruded rod can be permitted to cool. For example, the bent extruded rod may be cooled to a temperature below a glass transition temperature. In particular, the bent extruded rod may be allowed to cool to a temperature near room temperature. In an example, the bent rod is cooled with forced convection. Subsequently, the bent rod may be removed from the mold.

In preparation for joining the ends of the rod, the rod may optionally be dried. For example, the rod may be heated to a temperature in excess of 100° C. In a particular example, the rod may be heated to a temperature of at least about 110° C., such as at least 130° C., or even at least about 145° C. for a period of at least one hour, such as at least two hours, or even three hours or more. Alternatively, the rod may be removed from the mold in a hot state, but below its glass transition temperature. While the rod is in the hot state, the ends may be joined, such as through the melt welding process described below, which serves to maintain the rod in a dry condition without an additional drying step.

Once the rod has been bent into the desired circular shape, the ends of the extruded rod may be welded together by melting the ends of the rod and pressing them together to form a ring. In an example, the ends are melted using a heat source. For example, the heat source may be a contact heat source in which both of the ends contact the heat source and are melted via conduction. In an example, the contact heat source is a flat heated plate. In another example, the heat source may be a non-contact heat source, such as a radiant heat source or convective heat source. Alternatively, the ends may be joined using techniques, such as radiofrequency techniques including microwave techniques, inductive techniques, laser techniques, or any combination thereof. In a particular example, the ends of the rod are joined through hot melt welding. For example, the hot melt welding may include applying a heat source to the ends of the rod to melt portions of the rod proximal to the ends and once melted, pressing the ends together. In such an example, the ends of the rod are melted without melting the whole rod.

The temperature of the heat source will depend upon the thermoplastic materials making up the rod. In an example, the thermoplastic material has a melting point of at least 250° C. For example, the thermoplastic material may have a melting point of at least 300° C., such as at least 320° C. Using the example above, extruded PEEK has a melting temperature of approximately 343° C., while PTFE filler has a melting temperature of approximately 327° C. In a preferred embodiment, the ends of a thermoplastic rod having layers of PEEK and PTFE filled PEEK could be heated to a temperature above 343° C., but below the temperature at which either material will degrade. For example, Applicants have discovered experimentally that welded PEEK has a higher elongation at break when the ends are heated to a temperature of around 420° C. Lower temperatures (around 385° C.) appear to be too low to cause adequate bonding, while higher temperature (around 445° C.) may cause sample degradation.

Figure 4A:
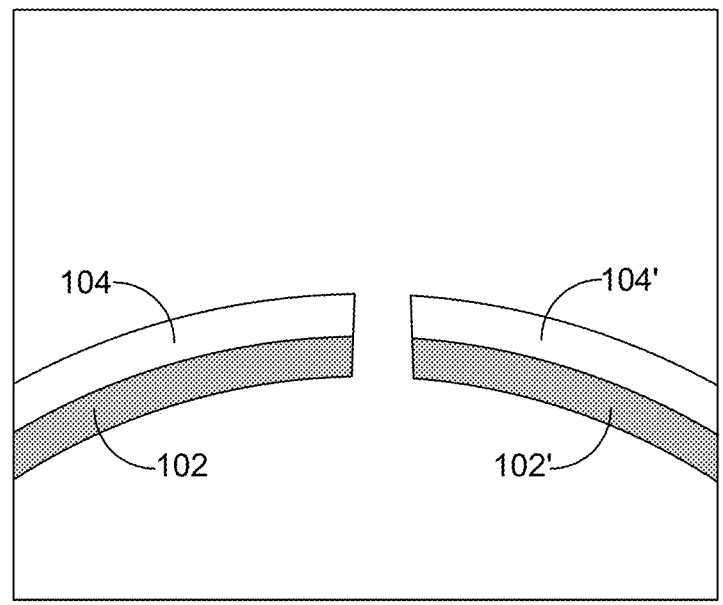
FIGS. 4A and 4B are schematic diagrams illustrating the process of welding ends of a thermoplastic rod bent into a circular shape according to embodiments of the present invention.
Figure 4B:
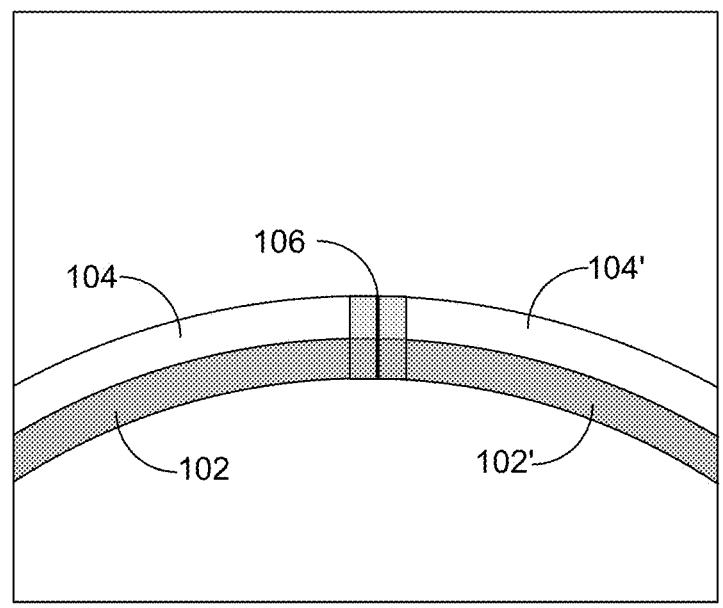
Figure 6:
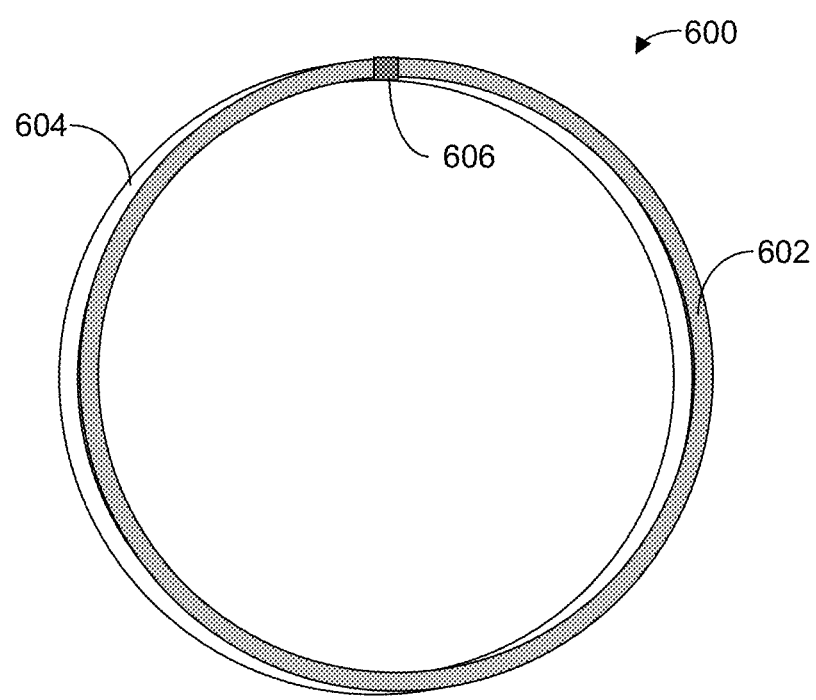
FIG. 6 shows a seal ring according to a preferred embodiment of the present invention in which two thermoplastic rods are joined to form a seal ring with two welds.

FIGS. 4A and 4B show the ends of the bent rod approaching each other and then pressed together. When the melted ends are pressed together, weld 404 is formed joining the two ends of the rod. In some preferred embodiments, a seal ring according to the present invention may include more than one weld, such as two welds, or even three welds or more. FIG. 6 shows a seal ring according to a preferred embodiment of the present invention in which two thermoplastic rods are joined to form a seal ring with two welds. Where multiple rods are formed together, it is preferable that the ends of the rods be joined as described above with support polymer joined to support polymer and functional polymer joined to functional polymer.

In addition, the welding or joining of arcs or portions can be used to form circular, ovular, polygonal or complex shaped seals. For example, the seal can have a polygonal shape, such as a triangle, square, rectangle, pentagon, hexagon, heptagon, octagon, or any combination thereof. The polygon may have at least four sides, such as at least 6 sides, at least 8 sides, or even at least 10 sides. In another example, a complex shape can be a FIG. 8, irregular polygons, or other complex shapes. In particular, the shapes may be closed. Alternatively, the shapes may be open, having one or more breaks along their extent.

The exemplary weld method can also be used to weld arcs of extruded or compression molded thermoplastics that are cut from a plate to create a welded ring with desirable properties after annealing. While welding is used herein to specifically denote a method of heating ends of rods and pressing the ends together, other joining techniques may be used to join the ends of rods. For example, other joining techniques may include injection-molding to join ends, ultrasonic treating, induction heating, or an irradiative techniques, such as a laser or a microwave technique. The connection between adjoined ends formed through any such method will be referred to herein as a "weld."

When the ends of an extruded rod including two or more layers of thermoplastic material are joined together, the ends are preferably joined so that one end of each of the layers is joined to the other end of the same layer as shown in FIGS. 4A and 4B. In other words, using the example above, the PEEK layer 102 would be welded to the other end of the PEEK layer 102', while the ends of the PTFE filled PEEK 104 and 104' would also be welded together. This will typically allow the mechanically desirable material, the unfilled PEEK in this example, to have the strongest possible weld 106.

Preferably, the layered rod is bent into a circular shape with one layer forming the inner perimeter of the ring and the other polymer layer forms the outer perimeter of the ring, as shown in FIG. 1. In other embodiments, the layered rod can be bent so that one layer forms one face of the resulting ring, while the other layer forms the other face, as shown in FIG. 6. Skilled persons will recognize that the desired final shape of the ring will be determined by the specific use for the ring, specifically for the functional layer of the ring. In many instances, it will be desirable for the functional layer, such as a PTFE filled PEEK layer, to be oriented toward the inside of the ring (toward the opening) with the support layer oriented toward the outer perimeter of the ring, as shown in FIG. 1.

Once the ends of the rod have been joined by welding, the extruded rod forms a welded ring. Preferably, the welded ring is then annealed by heating the ring to a temperature greater than the glass transition temperatures of the thermoplastic materials. By heating the welded ring in this fashion, the polymeric material will preferably diffuse across the weld, thus promoting chain entanglement at the weld zone and leading to higher elongation values.

In particular, the annealing temperature may be at least 1.2 times the glass transition temperature of at least one polymeric component of one or both of the layers, such as at least 1.5 times, or even at least 1.7 times the glass transition temperature, providing the melting point is not exceeded While higher temperatures reduce the amount of time at the annealing temperature needed to achieve optimum adhesion, the temperature should be below the flow temperature for the material of the layers to avoid deformation of the welded ring.

The welded ring is preferably held at the annealing temperature for a time sufficient for the at least one layer component to partially diffuse into the adjacent layer. The amount of time and the temperature in the annealing step needed to achieve the desired results or maximum weld adhesion can be determined by straightforward testing and will depend on factors apparent to those of skill in the art, such as the thickness of each layer and the particular compositions of the layers. In general, thicker layers and higher molecular weight components would require longer times or higher temperatures.

For example, a welded ring may be annealed at a temperature greater than the glass transition temperature of the extruded thermoplastic material for a period of at least two hours, such as at least four hours, or even at least six hours. In a particular example, the welded ring may be annealed, for example, at a temperature greater than 100° C., such as a temperature greater than 120° C., for a period of at least one hour, such as at least two hours. The temperature may be ramped to the annealing temperature at a rate in a range of 5° C. per hour to 15° C. per hour, such as 8° C. per hour to 12° C. per hour. Once the annealing temperature is reached, the temperature may be maintained for a period of at least two hours, such as at least four hours, at least six hours, or even eight hours or more. The ring may then be cooled at a controlled rate, such as a rate in a range of 5° C. per hour to 15° C. per hour, such as a range of 8° C. per hour to 12° C. per hour, to a temperature of less than the glass transition temperature. The welded ring may then be allowed to cool to room temperature. In an example, the ring is left in the oven while the oven is off until room temperature is reached.

Annealing the welded ring not only serves to strengthen the weld joining the ends of the thermoplastic rod together, it also strengthens the bond between the coextruded layers. Applicants have discovered that the bond between the layers is also significant in improving weld characteristics such as tensile strength and elongation to break. Applicants believe that the bond between the support layer and the functional layer serves to isolate tears or defects resulting from elongation of the welded functional layer, thus preventing the tears of the weak spots in the weld from propagating catastrophically. In this way, the elongation at break for the weaker functional layer can be improved, preferably to a value above 3%. For example, the weld elongation-at-break may be at least 5%, at least 10%, at least 20%, or even at least 30%. Preferably, the weld of the functional material and the bonded support material also has a tensile strength of at least 3100 psi such as at least 10000 psi, or even at least 15000 psi. Further, the weld of the functional material and the bonded support material will preferably have a tensile modulus of at least 100 ksi, such as at least 750 ksi, or even at least 850 ksi.

Further, Applicants have realized that the presence of a bonded support layer allows the seal ring to function even if the functional polymer layer is damaged. This is because the support layer will continue to hold the functional layer in the proper position. Thus, if tears or breaks do occur in the functional layer, as long as the support layer remains intact, the functional layer will remain in place and the seal ring will continue to function.

For this reason, Applicants have discovered that the bond between layers is a significant factor is selecting a support polymer. In preferred embodiments, the support material and the matrix material will be the same. This allows for maximum diffusion across the boundaries (both the weld boundary and the layer boundaries). Where different materials are used, it is desirable that the surface tensions of the polymer melts be sufficiently similar to allow wetting at the interface and adherence of the adjacent layers. Further, polymers having a similar polarity and solubility parameters will typically show a higher degree of diffusion and thus greater bond strength. In general, higher molecular weight polymers will show greater bond strength, but will require a longer annealing period.

Although much of the discussion herein is directed at the use of an extruded rod, other methods of forming a suitable thermoplastic rod could be used, including compression molding, or cutting one or more arcs out of a formed polymer sheet. Also, although much of the present discussion is directed at the use of a thermoplastic rod having two different layers, in some preferred embodiments of the present invention three or more layers could be used. For example, one preferred embodiment might use three layers, two functional layers sandwiching one support layer.

Figure 7:
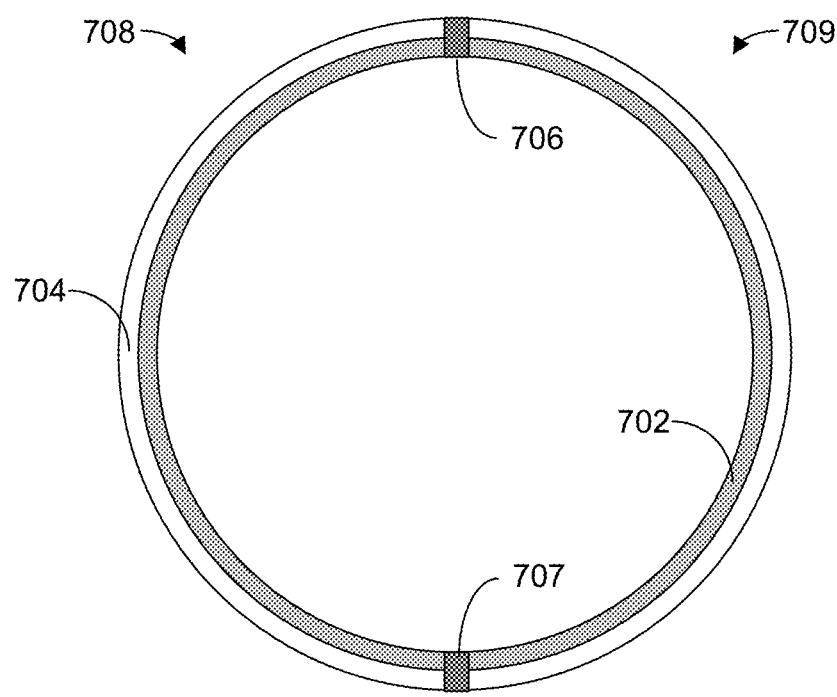
FIG. 7 shows a seal ring according to another preferred embodiment of the present invention.

Further, while the methods described herein are generally described in relation to seal rings formed from a single bent rod, the methods can be extended to seal rings formed from more than one thermoplastic rod, for example, 2, 3, 4, or more extruded rods. For example, FIG. 7 shows a seal ring according to another preferred embodiment of the present invention in formed from two separate rods 808, 809 and including two separate welds 706, 707.

FIGS. 8A and 8B show additional embodiments of the present invention in which the support layer is a center portion completely surrounded by the functional layer. In these embodiments, the rod can be formed by annular extrusion so that the outside surface of the rod is made up of functional layer 802 (for example, a layer of PTFE filled PEEK) while the core of the rod is formed from support material 804 (for example, unfilled PEEK). Once the rod is bent into a circular shape and welded, as described above, the functional layer 802 will completely surround the inner core of support material 804. As with the thermoplastic rods described above, extruded rods as shown in the embodiments of FIGS. 8A and 8B can have any desired cross section including a circular cross section as shown in FIG. 8A, a rectangular cross section as shown in FIG. 8B, or a polygonal cross section having 3 or more sides.

The invention has broad applicability and can provide many benefits as described and shown in the examples above. The embodiments will vary greatly depending upon the specific application, and not every embodiment will provide all of the benefits and meet all of the objectives that are achievable by the invention. Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present). Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method of forming a seal ring, the method comprising:
    forming a thermoplastic rod from at least a longitudinal layer of a first polymer and a longitudinal layer of a second polymer, and the extruded rod having first and second ends;
    heating the thermoplastic rod to a first temperature above the glass transition temperature of the first and second polymers;
    bending the thermoplastic rod into a circular structure while maintaining the temperature at least at the first temperature;
    heating the first and second ends of the extruded rod to a temperature above the melting temperature of the first and second polymers; and
    bringing the heated first and second ends of the extruded rod together to form a weld joining the ends together, wherein the welded second polymer has at least a first mechanical property that is more desirable than the first mechanical property of the welded first polymer, so that that the first mechanical property of the weld joining the ends of the extruded rod together is also more desirable than the first mechanical property of the welded first polymer, wherein the first polymer is oriented exclusively toward the interior of the seal, where the first mechanical property is selected from the group consisting of elongation at break, tensile strength, or tensile modulus.

2. The method of claim 1 in which bringing the heated first and second ends of the extruded rod together to form a weld comprises bringing the heated first and second ends of the thermoplastic rod together to form a weld joining the ends together so that the first and second ends of the layer of the first polymer are joined and the first and second ends of the layer of the second polymer are joined.

3. The method of claim 1 in which the first polymer comprises a filled polymer formed of a matrix polymer and a filler.

4. The method of claim 1 in which the first polymer comprises a polytetrafluoroethylene (PTFE) filled polymer formed of a matrix polymer and a PTFE filler.

5. The method of claim 1 in which the second polymer comprises an unfilled polymer.

6. The method of claim 4 in which the same polymer material is used for the second polymer and for the matrix polymer.

7. The method of claim 1 in which the thermoplastic rod is formed by coextrusion of the first polymer and the second polymer.

8. The method of claim 1 in which the thermoplastic rod is formed by compression molding.

9. A method of forming a seal ring, the method comprising:
   forming a thermoplastic rod by coextrusion of a polytetrafluoroethylene (PTFE) filled polymer and an unfilled polymer so that the formed thermoplastic rod includes at least a first layer of PTFE filled polymer and a second layer of unfilled polymer, the thermoplastic rod having first and second ends;
   heating the thermoplastic rod to a temperature above the glass transition temperature of the PTFE filled polymer and the unfilled polymer;
   bending the thermoplastic rod into a circular structure while maintaining the temperature above the glass transition temperature;
   bringing the heated first and second ends of the thermoplastic rod together to form a weld joining the ends together so that the first and second ends of the layer of PTFE filled polymer are joined and the first and second ends of the layer of unfilled polymer are joined, wherein the PTFE filled polymer is oriented exclusively toward the interior of the seal, wherein the weld joining the ends of the thermoplastic rod together has an elongation-to-break of at least 3%.

10. The method of claim 9 in which the PTFE filled polymer when welded has an elongation-to-break of less than 10%.

11. The method of claim 9 in which the unfilled polymer when welded has an elongation-to-break of greater than 3%.

12. A method of forming a seal ring by polymer welding, the method comprising:
   forming a thermoplastic rod including at least two layers by coextruding a first layer of a PTFE filled polymer and a second layer of a support polymer, the PTFE filled polymer when welded having an elongation-to-break of less than 3%, the support polymer when welded having an elongation-to-break of at least 3%, and the formed thermoplastic rod having first and second ends;
   heating the thermoplastic rod to a temperature above the glass transition temperature of the first and second layers;
   bending the thermoplastic rod into a circular shape;
   heating the first and second ends of the thermoplastic rod to a temperature above the melting temperature of the first and second layers; and
   bringing the heated first and second ends of the thermoplastic rod together to form a weld joining the ends together so that the first and second ends of the first layer are joined and the first and second ends of the second layer are joined, the weld having an elongation-to-break of at least 3%, wherein the PTFE filled polymer is oriented exclusively toward the interior of the seal.

13. The method of claim 12 in which the weld joining the ends of the thermoplastic rod together has an elongation-to-break which is greater than the elongation-to-break of the PTFE filled polymer when welded.

14. The method of claim 12 further comprising annealing the joined ends by ramping the temperature of the joined ends to a temperature greater than the glass transition temperature for the first and second layers, maintaining the joined ends at the temperature for a period of at least 2 hours, and cooling the seal ring.

15. The method of claim 12, wherein bringing the heated first and second ends together includes pressing the first and second ends together with a pressure of at least 50 psi.

16. The method of claim 12, wherein bending the thermoplastic rod into a circular shape comprises bending the thermoplastic rod into a circular shape so that one polymer layer forms the inner perimeter of the circular shape and the other polymer layer forms the outer perimeter of the circular shape.

17. The method of claim 12, wherein heating the first and second ends includes heating with a non-contact heat source.

18. A seal ring formed by the method of claim 1.

* * * * *